(12) United States Patent
Devilla et al.

(10) Patent No.: US 8,006,015 B2
(45) Date of Patent: Aug. 23, 2011

(54) DEVICE AND METHOD FOR MANAGING ACCESS REQUESTS

(75) Inventors: Yaki Devilla, Ra'Anana (IL); Moshe Anschel, Kafr-Sabe (IL); Kostantin Godin, Kafr-Sabe (IL); Amit Gur, Ra'Anana (IL); Itay Peled, Herzelia (IL)

(73) Assignee: Freescale Semiconductor, Inc., Austin, TX (US)

( * ) Notice: Subject to any disclaimer, the term of this patent is extended or adjusted under 35 U.S.C. 154(b) by 138 days.

(21) Appl. No.: 12/514,007

(22) PCT Filed: Nov. 8, 2006

(86) PCT No.: PCT/IB2006/054167
§ 371 (c)(1),
(2), (4) Date: May 7, 2009

(87) PCT Pub. No.: WO2008/056205
PCT Pub. Date: May 15, 2008

(65) Prior Publication Data
US 2010/0250806 A1 Sep. 30, 2010

(51) Int. Cl.
*G06F 12/00* (2006.01)
*G06F 13/14* (2006.01)
*G06F 13/38* (2006.01)
*G06F 13/00* (2006.01)
*G06F 9/34* (2006.01)

(52) U.S. Cl. .......... 710/240; 710/29; 710/241; 711/167; 711/169; 711/213

(58) Field of Classification Search .................... 710/29, 710/107, 113, 119, 240–242; 711/167, 169, 711/213
See application file for complete search history.

(56) References Cited

U.S. PATENT DOCUMENTS

| | | | |
|---|---|---|---|
| 6,052,772 A | 4/2000 | Kark et al. | |
| 6,460,101 B1 | 10/2002 | Arimilli et al. | |
| 6,505,265 B1 * | 1/2003 | Ishikawa et al. | 710/113 |
| 6,848,030 B2 | 1/2005 | Tokar et al. | |
| 7,464,410 B1 * | 12/2008 | Halasz et al. | 726/23 |
| 2003/0167294 A1 * | 9/2003 | Neuman | 709/102 |
| 2005/0027948 A1 * | 2/2005 | Marlan et al. | 711/150 |
| 2006/0020728 A1 | 1/2006 | Nakazono et al. | |
| 2007/0089114 A1 * | 4/2007 | MacInnis | 718/103 |

FOREIGN PATENT DOCUMENTS
EP 0720099 A1 * 3/1996
* cited by examiner

*Primary Examiner* — Thomas J Cleary

(57) ABSTRACT

A device and a method for managing access requests, the method includes: (i) receiving, from a master component coupled to a master bus, multiple access requests to access a slave component over a pipelined slave bus; acknowledging a received access request if: (a) at least an inter-access request delay period lapsed from a last acknowledgement of an access request; (b) an amount of pending acknowledged access requests is below a threshold; wherein the threshold is determined in response to a pipeline depth of the pipelined slave bus; (c) the received access request is valid; wherein a validity of an access request is responsive to a reception of an access request cancellation request; and (ii) providing information from the slave component, in response to at least one acknowledged access request.

20 Claims, 4 Drawing Sheets

DEVICE AND METHOD FOR MANAGING ACCESS REQUESTS

FIELD OF THE INVENTION

The present invention relates to devices and methods for managing access requests.

BACKGROUND OF THE INVENTION

The increasing complexity of integrated circuits has forced integrated circuit designers to develop pipelined components that connect one component to the other. In many integrated circuits various high-speed processors are connected to slower memory units. The processors and the memory units can be connected to different buses that have different widths, different clock signal frequencies as well as other optional characteristics.

Cache memory units, speculative fetch operations and predictive fetch operations were introduced in order to reduce timing penalties resulting from relative slow data retrieval operations. Speculative fetch operation as well as predictive fetch operations involve fetching information that was not explicitly requested by the processor.

Various fetch requests are usually generated by a processor and sent to the memory unit. The memory unit (or a memory unit access controller) may acknowledge these fetch requests and then send the requested information to the processor or to a cache memory unit.

In some cases a speculative (or predictive) fetch operation provides useful information that is used by the processor but in some cases the speculative (or predictive) fetch operations provide information that is not used by the processor, especially when the processor deviated from a previously estimated program progress.

FIG. 1 illustrates a prior art timing diagram 100 that illustrates various access requests, access requests acknowledge events and retrieved information units.

Timing diagram 100 illustrates a burst of four consecutive access requests (RX1-RX4 101-104) generated by a master component at times T1-T4. These access requests are acknowledged by a burst of four consecutive access acknowledgments (TX1-TX4 111-114) at times T2-T5. The acknowledged access requests are sent over a pipelined slave bus towards a slave component.

Assuming that neither of these acknowledged access request is timely cancelled the slave component provides information units IU1-IU4 121-124 during eight cycles (that start at T7-T14). Each information unit is sent to the master component during two beats. Thus, during times T7-T14 the master component receives information chunks IC_1,1 121 (1), IC_1,2 121(2), IC_2,1 122(1), IC_2,2 122(2), IC_3,1 123(1), IC_3,2 123(2), IC_4,1 124(1) and IC_4,2 124(2).

RX4 104 can be cancelled (before being acknowledged) until T4. Thus, only a narrow time window (of three access controller cycles) is provided for a simple cancellation of the speculative access request.

It is further noted that some device do not allow to cancel an acknowledged access request, thus even if the fetched information will not be useful, the device will have to service the access request.

There is a need to provide a device and method for managing data access requests.

SUMMARY OF THE PRESENT INVENTION

A device and a method for managing access requests, as described in the accompanying claims.

BRIEF DESCRIPTION OF THE DRAWINGS

The present invention will be understood and appreciated more fully from the following detailed description taken in conjunction with the drawings in which.

DETAILED DESCRIPTION OF PREFERRED EMBODIMENTS

The following figures illustrate exemplary embodiments of the invention. They are not intended to limit the scope of the invention but rather assist in understanding some of the embodiments of the invention. It is further noted that all the figures are out of scale.

A device and method for managing access requests are provided. The access requests propagate over at least one pipelined component such as a pipelined bus, a pipelined crossbar, a pipelined interconnect or any pipelined component (or group of components) that can convey information towards a slave components. For simplicity of explanation the following description will refer to a pipelined slave bus.

Figure 2:
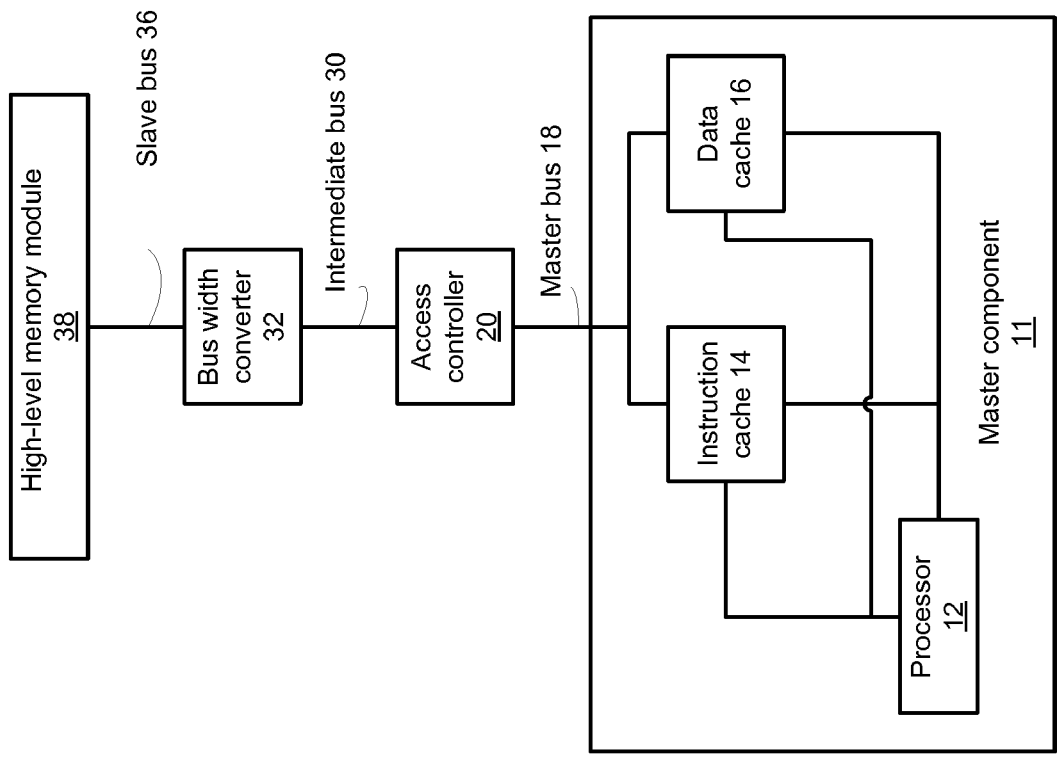
FIG. 2 illustrates a device having access requests management capabilities according to an embodiment of the invention.

Conveniently a device is provided. Such a device is illustrated in FIG. 2. The device includes a slave bus, a master bus, an access controller, a master component and a slave component. The master component can generate access requests to access the slave component. The slave component can be a memory unit and the master component can be a processor, but this is not necessarily so. It is noted that the access controller can be a part of the slave.

Conveniently, the access controller acknowledges an access request if the amount of pending acknowledged access requests does not exceed a threshold and if at least an inter-access request delay period has elapsed since the last acknowledgement of an access request. The mentioned above threshold can be defined as the depth of the pipelined component. The threshold indicates the maximal number of concurrently pending acknowledged access requests that were not completed.

Conveniently, the inter-access request delay period is determined in view of: (i) a relationship between the clock frequencies of the master bus and the slave bus, (ii) a relationship between the widths of the master bus and of the slave bus, (iii) number of accesses (beats) per access request, and (iv) slave component address set up time.

Conveniently, by introducing inter-access request delays between consecutive access request acknowledgments, the device has more time to cancel access requests. This feature is useful when some of the access requests are predictive access requests that can be cancelled after the assumption that caused their generation was either validated or invalidated. The same applies to speculative access requests.

For example, if the access request is a predictive fetch request based upon an estimated progress of a certain program then there is more time to cancel such a predictive fetch request if a branch prediction turned to be erroneous. Canceling a speculative fetch request before such the fetch request was acknowledges is very simple. It may involve deleting the access request from the master component or from a storage circuit (such as a queue) of the access controller. There is no need to track after the progress of the access request, as is required when the cancellation appears after the access request was acknowledged.

If the slave bus can serve access requests that are generated at a certain rate then the access controller will prevent the master component from sending access requests at a higher rate, by acknowledging access requests at that certain rate.

FIG. 2 illustrates device 10 according to an embodiment of the invention.

Device 10 can be a mobile device such as a mobile phone, media player, personal data accessory, laptop computer, palm computer and the like or a stationary device such as a server, a desktop computer and the like. Device 10 can include one or more integrated circuit, can include a system on chip and can include one or more memory units, memory controllers, processors (cores), peripherals, direct memory address controllers, crossbars and the like.

Device 10 includes slave bus 36, master bus 18, access controller 20, a slave component such as high-level memory unit 38, and master component 11. Master component 11 includes processor 12, instruction cache 14 and data cache 16. The master component 11 can generate fetch requests, predictive fetch requests as well as speculative fetch requests in order to retrieve information (data and alternatively or additionally, instructions) from higher level memory units, such as high-level memory unit 38.

Access controller 20 can determine whether to acknowledge a fetch request (access request) from master component 11. The determination is aimed to optimize the usage of slave bus 36 by preventing slave bus overloads (providing a significant period for canceling speculative fetch requests), as well as simplifying the cancellation of access requests, as canceling non-acknowledges access requests is much simpler than canceling acknowledged access requests.

FIG. 2 illustrates access controller 20 as being connected to intermediate bus 30 (that has the same width as master bus 18) that in turn is connected via bus width converter 32 to slave bus 36. It is noted that access controller 20 can also include a bus width converter and that bus width conversion is only optional.

It is further noted that an access controller 20 can manage access requests generated by multiple master components that can access the slave component.

First level unit 11 can generate access requests at a rate that cannot be supported by slave component 38 or by slave bus 36. The slave bus 36 or slave component 38 can service access requests at a lower rate. Access controller controls the access to slave bus 36 by not allowing continuous access requests to be acknowledged and be sent to slave component 38, but rather forces an inter-access request delay period between the acknowledgements of consecutive access requests.

Conveniently, the inter-access request delay period (D) equals $(F_M/F_S)*(W_M/W_S)*(BPA)-T_{SU}$, wherein $F_M$ is the frequency of the master bus clock signal, $F_S$ is the frequencies of the slave bus clock signal, $W_M$ is the width of the master bus, $W_S$ is the width of the slave bus, BPA is the number of access beats (transactions over the slave bus) per one access request and $T_{SU}$ is the slave component address setup time. The slave components address setup equals the number (zero or more) of slave clock signal cycles between an appearance of an address on the slave bus and the sampling of the address by the slave component.

Access controller 20 will not acknowledge an access request, if the number of pending acknowledged access request equals the pipeline depth, even if the inter-access request delay period lapsed since the acknowledgement of the last access request.

Figure 3:
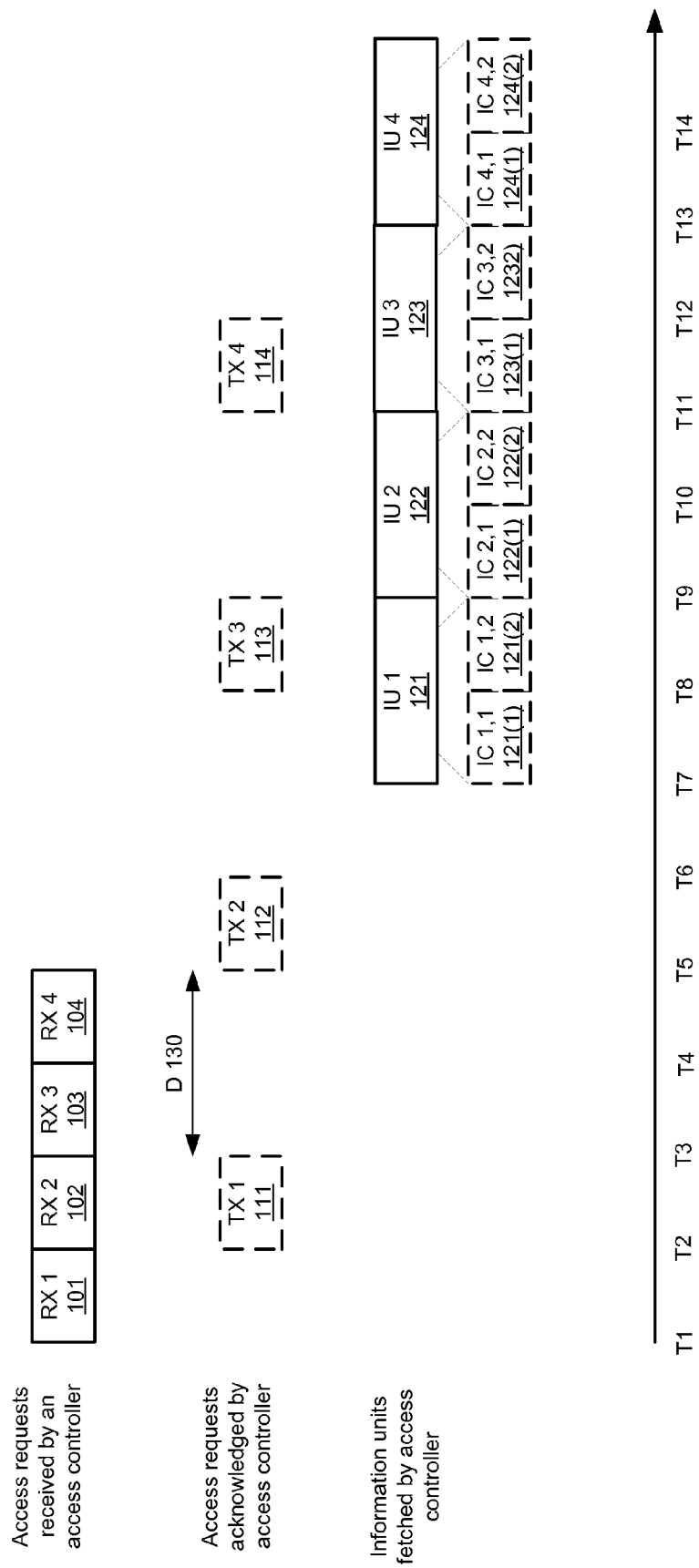
FIG. 3 illustrates a timing diagram of various access requests and fetch operations according to an embodiment of the invention.

FIG. 3 illustrates a prior art timing diagram 105 according to an embodiment of the invention.

It is assumed that a single access request (a request that may include a single address) results in two beats (BPA=2) of information. Each information unit can be fetched in response to a single access request. Each information unit includes two information chunks that are provided over the slave bus during two fetch beats.

It is further assumed that the pipeline depth of slave bus 36 is four.

Timing diagram 105 illustrates a burst of four consecutive access requests (RX1-RX4 101-104) generated by master component 11 at times T1-T4.

Access controller 20 acknowledges these access requests at times T2, T5, T8 and T11. Access controller 20 defines an inter-access request delay period (denoted D 130) of two cycles between the acknowledgement of consecutive access requests. D 130 is responsive to (i) the relationship between the clock signal frequencies of master bus 36 and slave bus 18, (ii) the relationship between the widths of master bus 36 and slave bus 18, (iii) number of accesses (beats) per access request, (iv) and slave component address set up time.

By introducing the inter-access request delay period RX4 can be deleted before being acknowledged until T12. Accordingly, access controller 20 provides a much wider access request cancellation period while maintaining the same level of performance.

Figure 1:
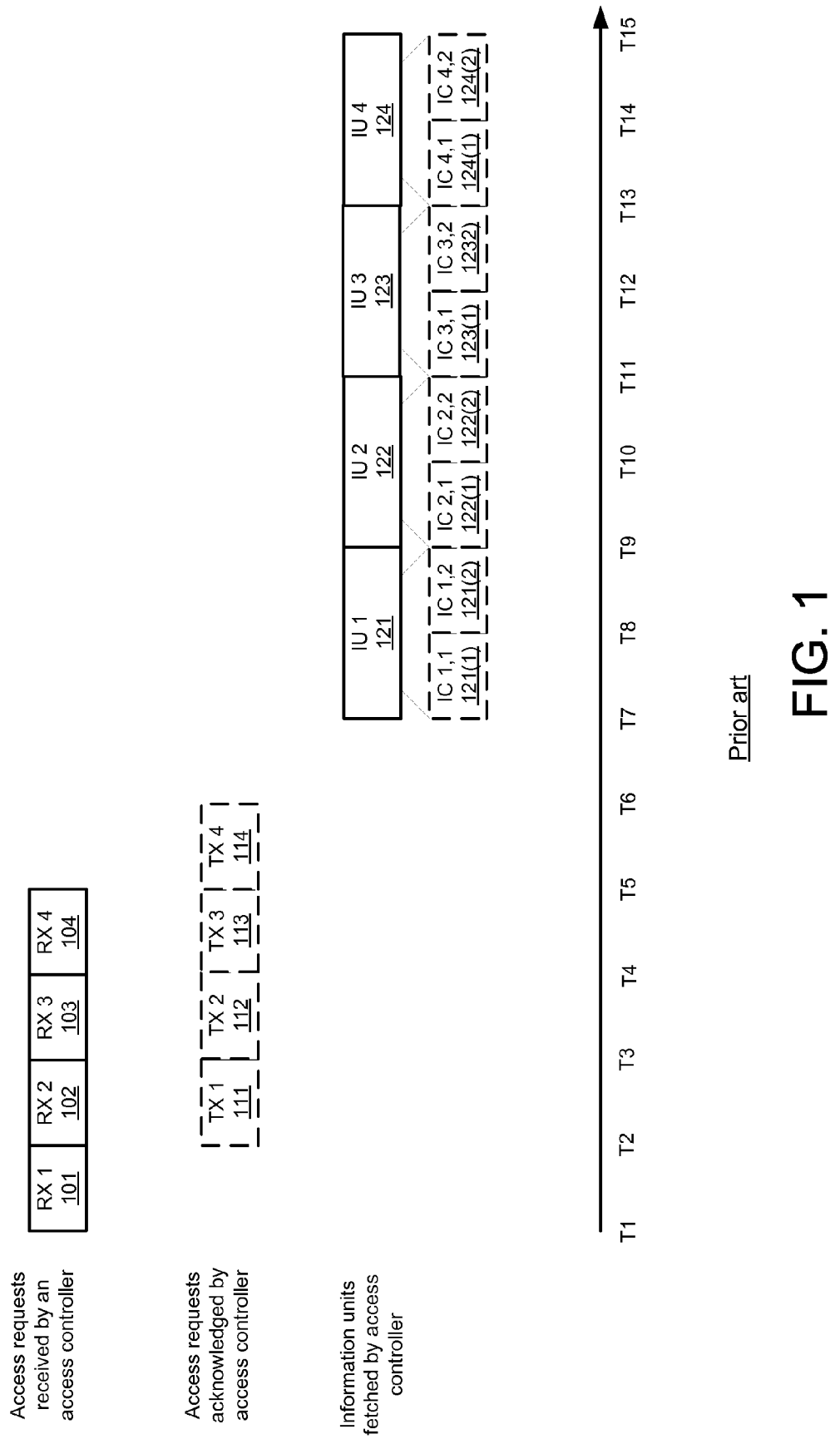
FIG. 1 is a prior art timing diagram.

Timing diagram 105 illustrates that all access requests were serviced (not terminated). Thus during times T7-T14 master component 11 receives information chunks IC_1,1-IC_4,2 121(1)-124(2) at the same timing as in FIG. 1 (no performance loss).

Figure 4:
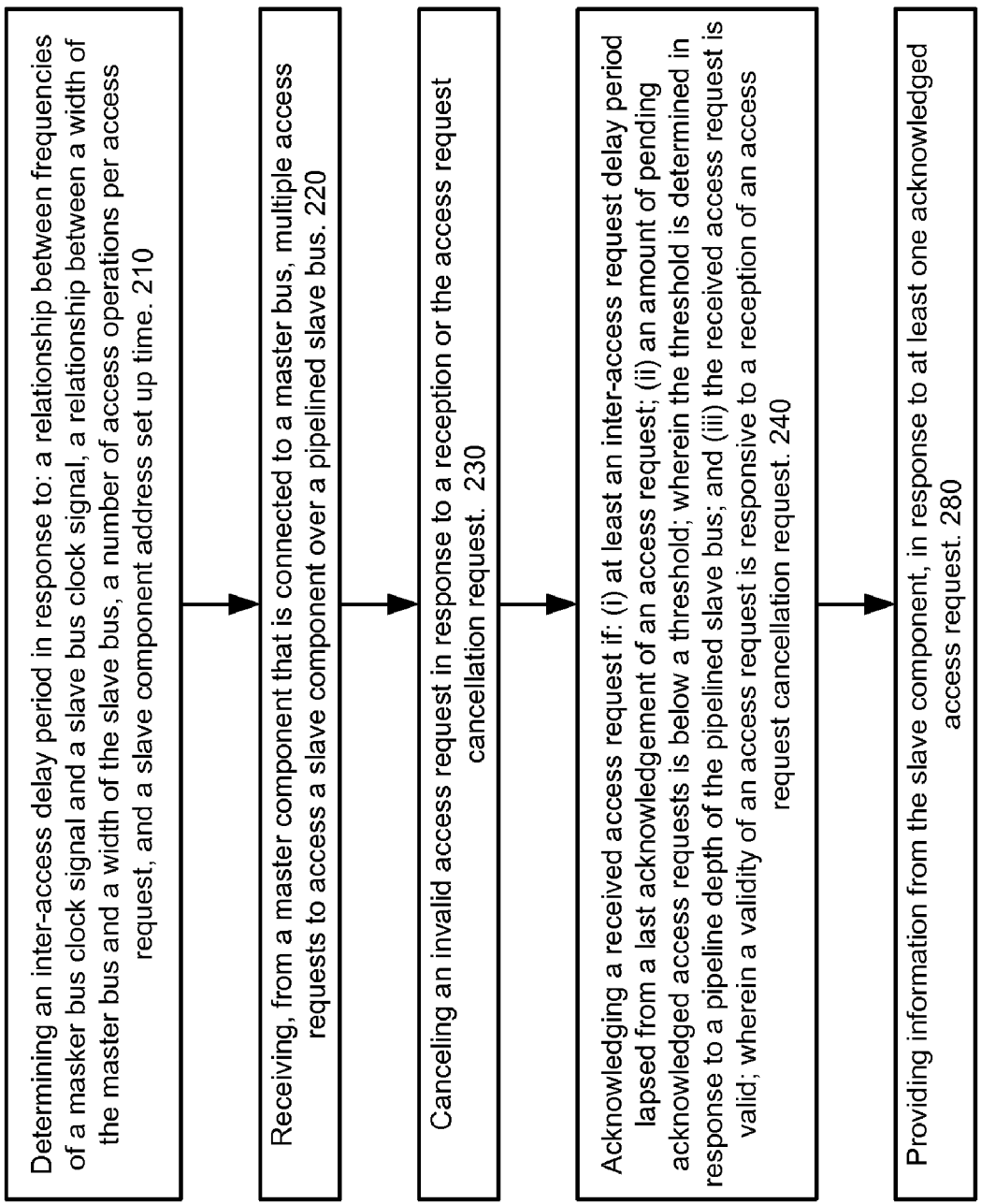
FIG. 4 illustrates a method for managing access requests according to an embodiment of the invention.

FIG. 4 illustrates method 200 for managing access requests, according to an embodiment of the invention.

Method 200 starts by stage 210 of determining an inter-access delay period in response to: (i) a relationship between frequencies of a master bus clock signal and a slave bus clock signal, (ii) a relationship between a width of the master bus and a width of the slave bus, (iii) a number of access operations per access request, and (iv) a slave component address set up time.

Conveniently, stage 210 of determining includes setting the inter access delay to $\{(F_M/F_S)*(W_M/W_S)*(BPA)-T_{SU}\}$, wherein $F_M$ is a frequency of a master bus clock signal, $F_S$ is a frequencies of a slave bus clock signal, $W_M$ is a width of the master bus, $W_S$ is a width of the slave bus, BPA is a number of access beats generated per one access request and $T_{SU}$ is a slave component address setup time.

Conveniently, stage 210 of determining includes determining an inter-access delay period that exceeds two cycles of the slave bus clock signal.

According to an embodiment of the invention method 200 starts by receiving (rather than determining) the inter-access delay period.

Stage 210 is followed by stage 220 of receiving, from a master component that is connected to a master bus, multiple access requests to access a slave component over a pipelined slave bus.

Stage 220 may include receiving speculative access request, receiving predictive access requests, receiving mandatory access requests and the like.

Stage 220 can be followed by stage 230 of canceling an invalid access request in response to a reception or the access request cancellation request. The canceling can include deleting an invalid access from a queue of the access controller, canceling the access request by the master component and the like.

Stage 230 can be followed by stage 240 of acknowledging a received access request if: (i) at least an inter-access request delay period lapsed from a last acknowledgement of an access request; (ii) an amount of pending acknowledged access requests is below a threshold; wherein the threshold is determined in response to a pipeline depth of the pipelined slave bus; and (iii) the received access request is valid; wherein a validity of an access request is responsive to a reception of an access request cancellation request.

Conveniently, stage 240 includes acknowledging received access requests at an average acknowledgement rate that is lower than a maximal access request generation rate of the master component.

Stage 240 is followed by stage 280 of providing information from the slave component, in response to at least one acknowledged access request.

Variations, modifications, and other implementations of what is described herein will occur to those of ordinary skill in the art without departing from the spirit and the scope of the invention as claimed. Accordingly, the invention is to be defined not by the preceding illustrative description but instead by the spirit and scope of the following claims.

We claim:

1. A method for managing access requests comprising:
  receiving, multiple access requests at a first interface of an access controller, the requests received from a master component via a master bus, the requests to access a slave component coupled to a second interface of the access controller via a pipelined slave bus;
  acknowledging, by the access controller, a received access request if:
    at least an inter-access request delay period lapsed from a last acknowledgement of an access request, the inter-access delay period greater than two cycles of a slave bus clock signal;
    an amount of pending acknowledged access requests is below a threshold; wherein the threshold is determined in response to a pipeline depth of the pipelined slave bus; and
    the received access request is valid; wherein a validity of an access request is responsive to a reception of an access request cancellation request; and
  providing information from the slave component, in response to at least one acknowledged access request.

2. The method according to claim 1 wherein method comprises:
  determining the inter-access delay period in response to:
    a relationship between frequencies of a master bus clock signal and the slave bus clock signal, a relationship between a width of the master bus and a width of the slave bus, a number of access operations per access request, and a slave component address set up time.

3. The method according to claim 2 wherein the determining comprises setting the inter access delay as $(F_M/F_S)*(W_M/W_S)*(BPA)-T_{SU}$, wherein $F_M$ is a frequency of a master bus clock signal, $F_S$ is a frequencies of a slave bus Clock signal, $W_M$ is a width of the master bus, $W_S$ is a width of the slave bus, BPA is a number of access beats generated per one access request and $T_{SU}$ is a slave component address setup time.

4. The method according to claim 2 wherein the receiving comprises receiving a predictive access request.

5. The method according to claim 1 wherein the receiving comprises receiving a speculative access request.

6. The method according to claim 1 wherein the acknowledging comprises acknowledging received access requests at an average acknowledgement rate that is lower than a maximal access request generation rate of the master component.

7. The method according to claim 1 wherein the receiving is followed by canceling an invalid access request in response to a reception at the access controller of an access cancellation request from the master component.

8. A device comprising:
  a master component coupled to an access controller via a master bus; and
  a slave component coupled to the access controller via a pipelined slave bus,
  the access controller adapted to:
    receive, from the master component, access requests to access the slave component;
    acknowledge a received access request if:
      at least an inter-access request delay period lapsed from a last acknowledgement of an access request;
      an amount of pending acknowledged access requests is below a threshold; wherein the threshold is determined in response to a pipeline depth of the pipelined slave bus; and
      the received access request is valid; wherein a validity of an access request is responsive to a reception of an access request cancellation request; and
    provide information from the slave component, in response to at least one acknowledged access request.

9. The device according to claim 8 wherein the access controller is adapted to determine the inter-access delay period in response to a relationship between frequencies of a master bus clock signal and a slave bus clock signal, a relationship between a width of the master bus and a width of the slave bus, a number of access operations per access request, and a slave component address set up time.

10. The device according to claim 9 wherein the access controller is adapted to set the inter access delay as $(F_M/F_S)*(W_M/W_S)*(BPA)-T_{SU}$, wherein $F_M$ is a frequency of the master bus clock signal, $F_S$ is a frequencies of the slave bus clock signal, $W_M$ is the width of the master bus, $W_S$ is the width of the slave bus, BPA is the number of access beats generated per one access request and $T_{SU}$ is the slave component address setup time.

11. The device according to claim 9 wherein the access controller is adapted to determine an inter-access delay period that exceeds two cycles of the slave bus clock signal.

12. The device according to claim 8 wherein the master component is adapted to send to the access controller a predictive access request.

13. The device according to claim 9 wherein the master component is adapted to send to the access controller a predictive access request.

14. The device according to claim 8 wherein the master component is adapted to send to the access controller a speculative access request.

15. The device according to claim 8 wherein the access controller is adapted to acknowledge received access requests at an average acknowledgement rate that is lower than a maximal access request generation rate of the master component.

16. The device according to claim 8 wherein the access controller is adapted to cancel an invalid access request in response to a reception of an access cancellation request from the master component.

17. The device according to claim 9 wherein the master component is adapted to send to the access controller a speculative access request.

18. A method comprising:
receiving, from a master component coupled to a master bus, multiple access requests to access a slave component over a pipelined slave bus;
acknowledging a received access request if:
   at least an inter-access request delay period lapsed from a last acknowledgement of an access request, the inter-access request determined based on a relationship between frequencies of a master bus clock signal and a slave bus clock signal, a relationship between a width of the master bus and a width of the slave bus, a number of access operations per access request, and a slave component address set up time;
   an amount of pending acknowledged access requests is below a threshold; wherein the threshold is determined in response to a pipeline depth of the pipelined slave bus; and
   the received access request is valid; wherein a validity of an access request is responsive to a reception of an access request cancellation request; and
providing information from the slave component, in response to at least one acknowledged access request.

19. The method of claim 18 further comprising cancelling an invalid access request in response to a reception of an access cancellation request from the master component.

20. The method according to claim 18 wherein the receiving comprises receiving a speculative access request.

* * * * *